US012094425B2

(12) United States Patent
Hong et al.

(10) Patent No.: US 12,094,425 B2
(45) Date of Patent: Sep. 17, 2024

(54) DRIVING DEVICE AND DRIVING METHOD OF ELECTROLUMINESCENT DISPLAY APPARATUS

(71) Applicant: LG Display Co., Ltd., Seoul (KR)

(72) Inventors: Moo Kyoung Hong, Paju-si (KR); Sin Kyun Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/371,747

(22) Filed: Sep. 22, 2023

(65) Prior Publication Data

US 2024/0212629 A1 Jun. 27, 2024

(30) Foreign Application Priority Data

Dec. 23, 2022 (KR) ........................ 10-2022-0182598

(51) Int. Cl.
*G09G 3/3291* (2016.01)

(52) U.S. Cl.
CPC ... *G09G 3/3291* (2013.01); *G09G 2300/0408* (2013.01); *G09G 2310/0251* (2013.01)

(58) Field of Classification Search
None
See application file for complete search history.

(56) References Cited

U.S. PATENT DOCUMENTS 10,269,278 B2 * 4/2019 Lin ........................ G09G 3/006
2023/0215358 A1 * 7/2023 Park ..................... G09G 3/3233 345/76

* cited by examiner

*Primary Examiner* — Stephen T. Reed
(74) *Attorney, Agent, or Firm* — POLSINELLI PC

(57) ABSTRACT

A driving device of an electroluminescent display apparatus includes a pixel line determiner selecting a representative pixel line, disposed at a position at which an accumulation stress caused by an input image is largest, from among all pixel lines, a first sensing & driving circuit pre-sensing pixels of the representative pixel line for each color, an over driving control (ODC) controller selecting a color-based sample pixel characteristic value from among pixel characteristic values of the representative pixel line obtained through the pre-sensing and controlling a sensing priority of each color, based on a relative magnitude of a variation amount of the color-based sample pixel characteristic value, a second sensing & driving circuit performing ODC sensing on color pixels of all pixel lines, based on the sensing priority, and a compensation value generator updating compensation values of the color pixels, based on pixel characteristic values of the color pixels obtained through the ODC sensing, wherein a sensing data voltage supplied to each of the color pixels has multi-voltage levels, in a sensing period for the ODC sensing.

20 Claims, 10 Drawing Sheets

DRIVING DEVICE AND DRIVING METHOD OF ELECTROLUMINESCENT DISPLAY APPARATUS

CROSS-REFERENCE TO RELATED APPLICATION

This application claims the priority of the Korean Patent Application No. 10-2022-0182598 filed on Dec. 23, 2022, which is hereby incorporated by reference in its entirety.

BACKGROUND

Field of the Disclosure

The present disclosure relates to a driving device and a driving method of electroluminescent display apparatus.

Description of the Background

Each of pixels of electroluminescent display apparatuses includes a light emitting device self-emitting light and a driving element, and each pixel controls a driving current flowing in a driving element with a data voltage based on a gray level of image data to adjust luminance.

A threshold voltage of a driving element may be shifted in pixels as a driving time elapses. In this case, a driving current generated by a driving element may vary between pixels even when the same data voltage is applied. A deviation of the driving current causes luminance non-uniformity to degrade image quality.

In electroluminescent display apparatuses, compensation technology has been known where a sensing value is obtained by sensing a threshold voltage of a driving element included in each pixel and image data to be input to each pixel is corrected based on the sensing value. However, in electroluminescent display apparatuses of the related art because much time for sensing a threshold voltage of a driving element is needed, a compensation period increases, and compensation performance is low.

SUMMARY

Accordingly, the present disclosure is to provide a driving device and a driving method of an electroluminescent display apparatus, which may shorten a sensing time of a threshold voltage of a driving element to enhance compensation performance.

To achieve these objects and other advantages and in accordance with the purpose of the disclosure, as embodied and broadly described herein, a driving device of an electroluminescent display apparatus includes a pixel line determiner selecting a representative pixel line, disposed at a position at which an accumulation stress caused by an input image is largest, from among all pixel lines, a first sensing & driving circuit pre-sensing pixels of the representative pixel line for each color, an over driving control (ODC) controller selecting a color-based sample pixel characteristic value from among pixel characteristic values of the representative pixel line obtained through the pre-sensing and controlling a sensing priority of each color, based on a relative magnitude of a variation amount of the color-based sample pixel characteristic value, a second sensing & driving circuit performing ODC sensing on color pixels of all pixel lines, based on the sensing priority, and a compensation value generator updating compensation values of the color pixels, based on pixel characteristic values of the color pixels obtained through the ODC sensing, wherein a sensing data voltage supplied to each of the color pixels has multi-voltage levels, in a sensing period for the ODC sensing.

In another aspect of the present disclosure, a driving method of an electroluminescent display apparatus includes selecting a representative pixel line, disposed at a position at which an accumulation stress caused by an input image is largest, from among all pixel lines, pre-sensing pixels of the representative pixel line for each color, selecting a color-based sample pixel characteristic value from among pixel characteristic values of the representative pixel line obtained through the pre-sensing and controlling a sensing priority of each color, based on a relative magnitude of a variation amount of the color-based sample pixel characteristic value, performing over driving control (ODC) sensing on color pixels of all pixel lines, based on the sensing priority, and updating compensation values of the color pixels, based on pixel characteristic values of the color pixels obtained through the ODC sensing, wherein a sensing data voltage supplied to each of the color pixels has multi-voltage levels, in a sensing period for the ODC sensing.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate aspects of the disclosure and together with the description serve to explain the principle of the disclosure.

In the drawings.

DETAILED DESCRIPTION

Figure 1:
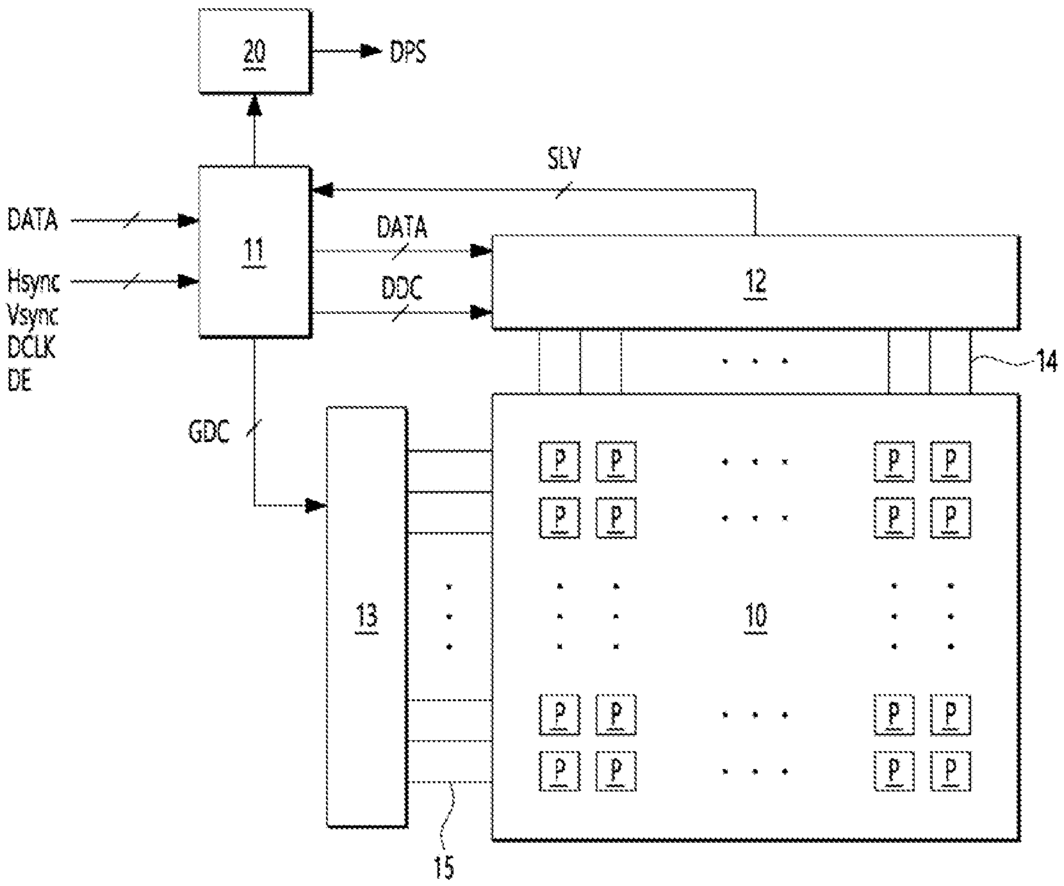
FIG. 1 is a block diagram illustrating an electroluminescent display apparatus according to the present aspect.

Hereinafter, exemplary aspects of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

A scan signal (or a gate signal) applied to pixels may swing between a gate on voltage and a gate off voltage. The gate on voltage may be set to a voltage which is higher than a threshold voltage of a transistor, and the gate off voltage may be set to a voltage which is lower than the threshold voltage of the transistor. The transistor may be turned on in response to the gate on voltage and may be turned off in response to the gate off voltage. In N-channel transistors, the gate on voltage may be a gate high voltage (VGH), and the gate off voltage may be a gate low voltage (VGL). In P-channel transistors, the gate on voltage may be the gate low voltage (VGL), and the gate off voltage may be the gate high voltage (VGH).

Figure 2:
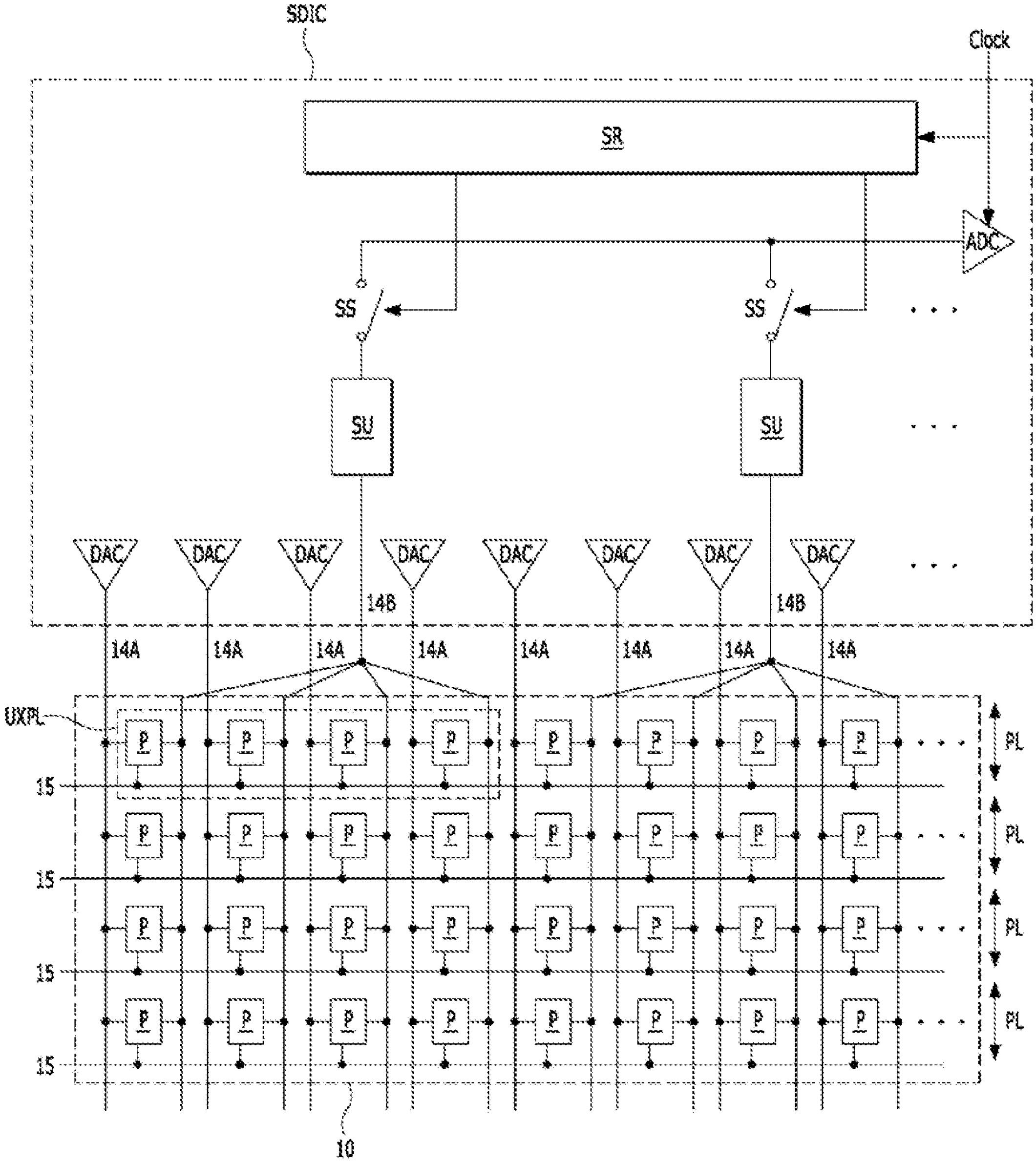
FIG. 2 is a diagram illustrating a connection configuration of a pixel array and a source driving integrated circuit (IC)

FIG. 1 is a block diagram illustrating an electroluminescent display apparatus according to the present aspect. FIG. 2 is a diagram illustrating a connection configuration of a pixel array and a source driving integrated circuit (IC).

Referring to FIGS. 1 and 2, the electroluminescent display apparatus according to the present aspect may include a display panel 10, a timing controller 11, a data driving circuit 12, a gate driving circuit 13, a sensing circuit SU, and a power circuit 20. The sensing circuit SU may be embedded in the data driving circuit 12, but is not limited thereto.

In a screen displaying an input image in the display panel 10, first signal lines 14 extending in a column direction (or a vertical direction) may intersect with second signal lines 15 extending in a row direction (or a horizontal direction), and a plurality of pixels P may be respectively provided in a plurality of intersection areas and may be arranged as a matrix type to configure a pixel array. The first signal lines 14 may include a plurality of data lines 14A through which data voltages are supplied and a plurality of reference voltage lines 14B through which a reference voltage is supplied. The reference voltage lines 14B may connect the pixels P with the sensing circuit SU and may be referred to as a sensing line. The second signal lines 15 may be gate lines through which scan signals are supplied.

The pixel array may include a plurality of pixel lines PL. Here, the pixel line PL may not denote a physical signal line but may be defined as a pixel set of pixels of one line arranged adjacent to one another in a horizontal direction or defined as a pixel block of pixels of one line. The pixels P may be grouped into a plurality of groups and may implement various colors. When a pixel group for implementing colors is defined as a unit pixel UPXL, one unit pixel UPXL may include red (R), green (G), blue (B), and white (W) pixels. The R, G, B, and W pixels configuring the one unit pixel UPXL may be arranged adjacent to one another in a horizontal direction and may be designed to share the same reference voltage line 14B, and thus, the pixel array may be simplified.

The timing controller 11 may correct digital video data DATA input from a host system, based on a compensation value for compensating for a pixel characteristic value deviation, and then, may supply corrected digital image data DATA to the data driving circuit 12. A pixel characteristic value may be a threshold voltage of a driving element included in each of the pixels P. The pixel characteristic values of the pixels P may be obtained through a sensing operation in a sleep mode period, which will be described below.

The timing controller 11 may receive a timing signal such as a vertical synchronization signal Vsync, a horizontal synchronization signal Hsync, a data enable signal DE, and a dot clock DCLK from the host system and may generate timing control signals suitable for a display mode and a sensing mode. The timing control signals may include a gate timing control signal GDC for controlling an operation timing of the gate driving circuit 13 and a data timing control signal DDC for controlling an operation timing of the data driving circuit 12. In a case where the sensing circuit SU is embedded in the data driving circuit 12, the data timing control signal DDC may include an initialization control signal SPRE and a sampling control signal SAM of FIG. 3.

The timing controller 11 may activate a sleep mode under a predetermined condition. A screen of the display panel 10 may be turned off in performing a sleep mode operation. However, in the sleep mode, the timing controller 11, the data driving circuit 12, the gate driving circuit 13, the sensing circuit SU, and the power circuit 20 may be normally performed. The sleep mode may be differentiated from a display mode where an input image is displayed on the screen of the display panel 10. When a user input for entering the sleep mode is received in the middle of performing the display mode, the timing controller 11 may stop the display mode and may activate a sleep mode operation. Also, the timing controller 11 may stop the display mode and may activate the sleep mode operation at a period of a certain time independently of the user input.

The timing controller 11 may activate a sensing mode for sensing pixel characteristic values of pixels P in the middle of performing a sleep mode. The sleep mode may provide a time for sensing pixel characteristic values in a display apparatus (for example, a continuous-driving display apparatus such as a public advertising display apparatus or a gaming display apparatus) which is in a situation which is difficult to turn off a system power (an alternating current (AC) power). Such a display apparatus may not have a power off sequence operation like a display apparatus for televisions (TVs), and thus, may activate a separate sleep mode for sensing pixel characteristic values.

The sleep mode period and the sensing performance may have a trade-off relationship. As the sleep mode period is set to be longer, the sensing performance may be easily enhanced, and in this case, continuous driving which is the fundamental purpose of display apparatuses may be hindered. Considering the fundament purpose, it may need to fastest sense sensing pixel characteristic values in a short sleep mode period. To this end, the present aspect described below may propose an ODC sensing method based on a sensing data voltage having a multi-voltage level.

The timing controller 11 may obtain a characteristic value sensing value of each pixel in the sensing mode, calculate a compensation value of each pixel on the basis of the characteristic value sensing value, and store the calculated compensation value in a memory. The timing controller 11 may download the compensation value from the memory in the display mode and may correct the digital image data DATA of each pixel by using the compensation value to compensate for a threshold voltage deviation between the pixels P.

The data driving circuit 12 may include one or more source driving ICs SDIC. Each of the source driving ICs SDIC may include a latch array, a plurality of digital-to-analog converters DAC respectively connected to the data lines 14A, a plurality of sensing circuits SU respectively connected to the sensing lines 14B, a plurality of analog-to-digital converters ADC, a plurality of multiplex switches SS which selectively connect the sensing circuits SU to the analog-to-digital converters ADC, and a shift register SR which sequentially turns on the multiplex switches SS.

The latch array may latch the digital image data DATA input from the timing controller 11, based on the data control signal DDC, and may supply the latched digital image data DATA to the digital-to-analog converters DAC. In the display mode, the digital-to-analog converters DAC may convert the latched image data DATA into display data voltages and may supply the display data voltages to the data lines 14A. In the sensing mode, the digital-to-analog converters DAC may supply sensing data voltages having predetermined multi-voltage levels to the data lines 14A.

The sensing circuits SU and the analog-to-digital converters ADC may operate in the sensing mode and may stop an operation in the display mode. The sensing circuit SU may supply a reference voltage Vpre to the sensing line 14B, based on the data control signal DDC, or may sense a pixel characteristic value input through the sensing line 14B and may supply the sensed pixel characteristic value to the analog-to-digital converter ADC. The analog-to-digital converter ADC may convert pixel characteristic values, input from the sensing circuits SU, into digital sensing values SLV and may transfer the pixel characteristic values to the timing controller 11.

The gate driving circuit 13 may generate a scan signal (SCAN of FIG. 3) suitable for the display mode and the sensing mode, based on the gate control signal GDC, and may supply the scan signal to the gate lines 15. The scan signal may include a display scan signal for a display operation and a sensing scan signal for a sensing operation. The sensing operation may be performed during an on period of the sensing scan signal. To secure sufficient sensing performance, the on period of the sensing scan signal may be wider than an on period of the display scan signal.

The power circuit 20 may generate a direct current (DC) power and an alternating current (AC) power needed for panel driving.

The driving device of the electroluminescent display apparatus according to the present aspect may include the timing controller 11, the data driving circuit 12, the gate driving circuit 13, and the sensing circuit SU described above. The driving device of the electroluminescent display apparatus may use external compensation technology based on ODC sensing performed in a sleep mode, to compensate for a pixel characteristic value deviation between the pixels P.

The driving device of the electroluminescent display apparatus according to the present aspect may perform an ODC sensing operation in a sleep mode period, based on a sensing data voltage having multi-voltage levels, and thus, may considerably shorten one sensing period corresponding to all pixels.

The driving device of the electroluminescent display apparatus according to the present aspect may determine a color-based sensing priority in descending order of pixel a variation amount of characteristic value, based on data counting, and may perform a color-based ODC sensing operation and a compensation value update operation according to the sensing priority in a sleep mode period. When a current sleep mode period ends in performing the ODC sensing operation, the driving device of the electroluminescent display apparatus may delete sensing values of color pixels on which sensing is not completed and may perform the ODC sensing operation and the compensation value update operation from the color pixels on which sensing is not completed, in entering a next sleep mode, and thus, may secure sensing and compensation performance.

Figure 3:
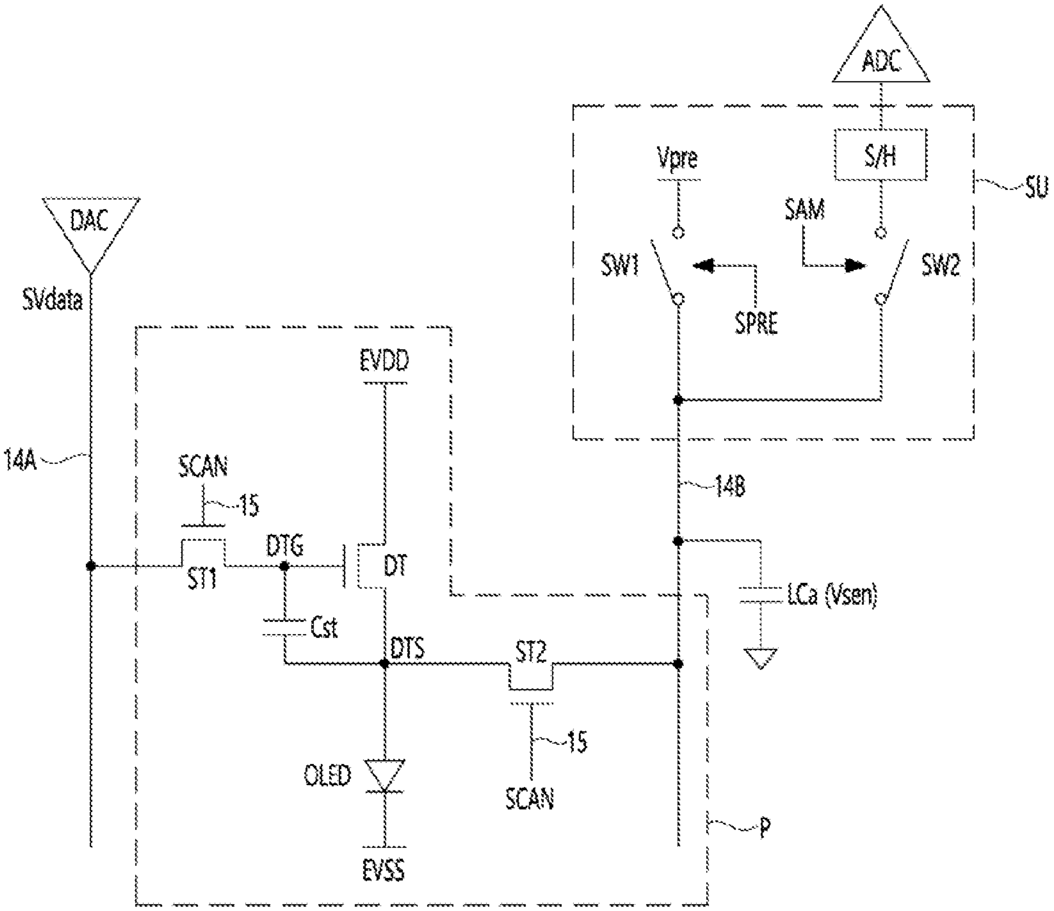
FIG. 3 is a diagram illustrating a connection configuration of a pixel and a sensing circuit.

FIG. 3 is a diagram illustrating a connection configuration of a pixel P and a sensing circuit SU.

Referring to FIG. 3, the pixel P may be implemented in a structure capable of a display operation and a sensing operation. The pixel P may include a light emitting device OLED, a driving transistor DT, a storage capacitor Cst, a first switch transistor ST1, and a second switch transistor ST2. The transistors DT, ST1, and ST2 may each be implemented as a thin film transistor (TFT). TFTs may be implemented as a P type, an N type, or a hybrid type where the P type and the N type are provided in common. Also, a semiconductor layer of a TFT may include amorphous silicon, polysilicon, or oxide.

The light emitting device OLED may include an anode electrode connected to a source node DTS, a cathode electrode connected to an input terminal of a low level driving voltage EVSS, and an organic compound layer disposed between the anode electrode and the cathode electrode. The organic compound layer may include a hole injection layer (HIL), a hole transport layer (HTL), an emission layer (EML), an electron transport layer (ETL), and an electron injection layer (EIL).

The driving transistor DT may be a driving element which controls a level of a drain-source current (hereinafter referred to as Ids) of the driving transistor DT input to the light emitting device OLED, based on a gate-source voltage (hereinafter referred to as Vgs) thereof. The driving transistor DT may include a gate electrode connected with a gate node DTG, a drain electrode connected with an input terminal of a high level driving voltage EVDD, and a source electrode connected with a source node DTS.

The storage capacitor Cst may be connected between the gate node DTG and the source node DTS and may hold the Vgs of the driving transistor DT during a predetermined period.

The first switch transistor ST1 may electrically connect a data line 14A with the gate node DTG, based on a scan signal SCAN from a gate line 15, and may allow a sensing data voltage SVdata to be charged into the gate node DTG. The first switch transistor ST1 may include a gate electrode connected with the gate line 15, a drain electrode connected with the data line 14A, and a source electrode connected with the gate node DTG.

The second switch transistor ST2 may electrically connect the source node DTS with the sensing line 14B, based on the scan signal SCAN, and thus, may allow a reference voltage Vpre to be charged into the source node DTS. Also, the second switch transistor ST2 may allow a source node voltage, corresponding to the Ids of the driving transistor DT, to be charged into a line capacitor LCa of the sensing line 14B. The second switch transistor ST2 may include a gate electrode connected with the gate line 15, a drain electrode connected with the sensing line 14B, and a source electrode connected with the source node DTS.

Referring to FIG. 3, the sensing circuit SU may be implemented as a voltage sensing type.

The sensing circuit SU may be for supplying the reference voltage Vpre to the pixel P and sampling a sensing voltage Vsen stored in the line capacitor LCa of the sensing line 14B and may include a reference voltage control switch SW1, a sampling switch SW2, and a sample and holder S/H. The reference voltage control switch SW1 may connect an input terminal of the reference voltage Vpre with the sensing line 14B, based on the initialization control signal SPRE. The sampling switch SW2 may connect the sensing line 14B with the sample and holder S/H, based on the sampling control signal SAM. The reference voltage control switch SW1 and the sampling switch SW2 may be turned on/off to be opposite to each other in performing an off sequence sensing operation.

A voltage charged into the line capacitor LCa may be the sensing voltage Vsen which is input to the sensing circuit SU. When a threshold voltage of the driving transistor DT is shifted by a degradation, the Ids of the driving transistor DT may be shifted, and thus, a level of the sensing voltage Vsen may be shifted. Accordingly, a threshold voltage variation of the driving transistor DT may be determined based on a level of the sensing voltage Vsen.

The sample and holder S/H may sample and hold the sensing voltage Vsen stored in the line capacitor LCa of the sensing line 14B while the sampling switch SW2 is being turned on, and then, may transfer a sampled sensing voltage to the analog-to-digital converter ADC.

Figure 4:
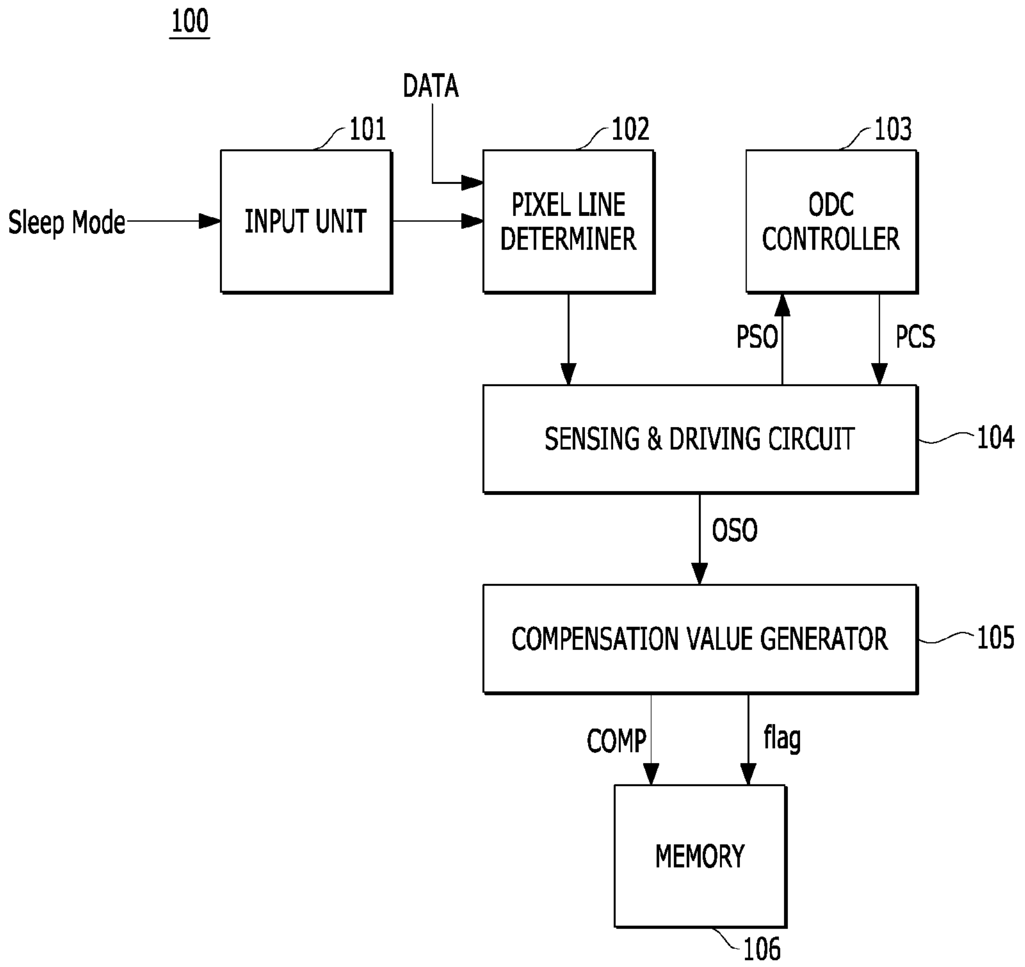
FIG. 4 is a block diagram illustrating a driving device of an electroluminescent display apparatus according to the present aspect.
Figure 5:
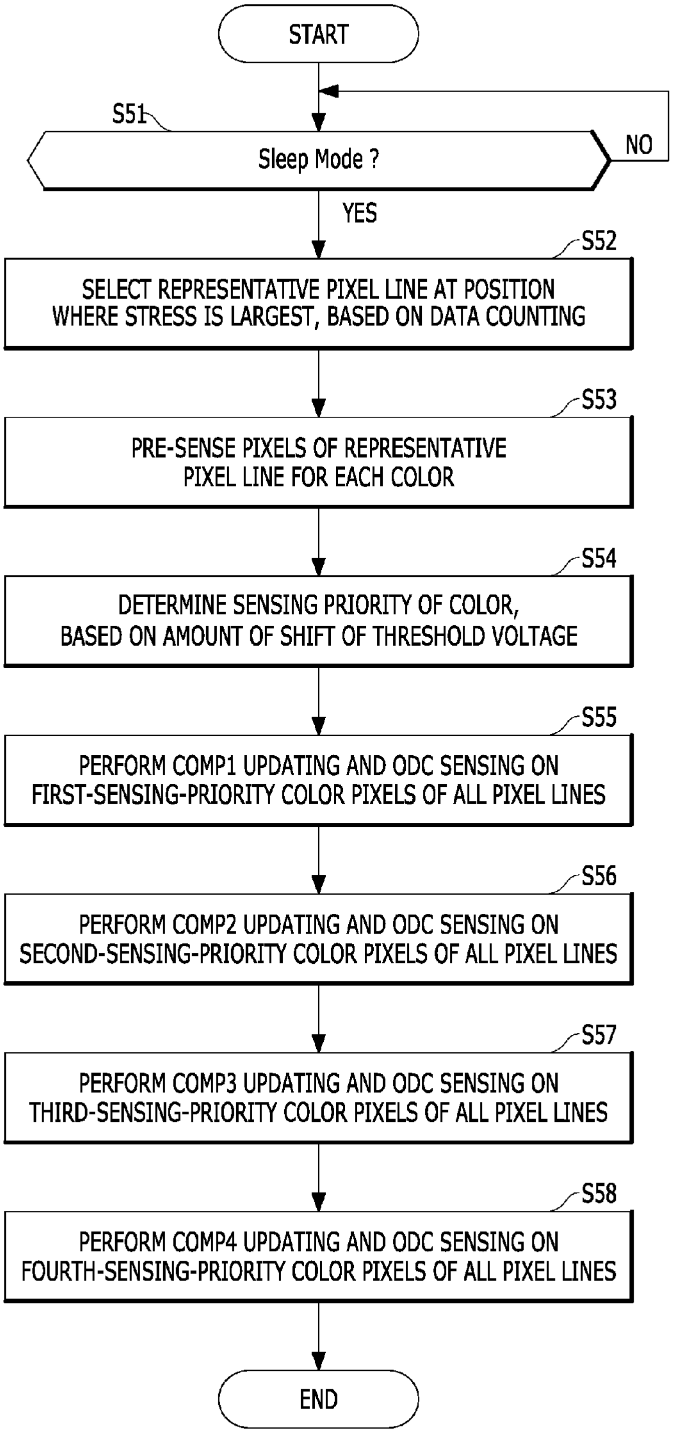
FIG. 5 is a flowchart illustrating a driving method of an electroluminescent display apparatus according to the present aspect.
Figure 6:
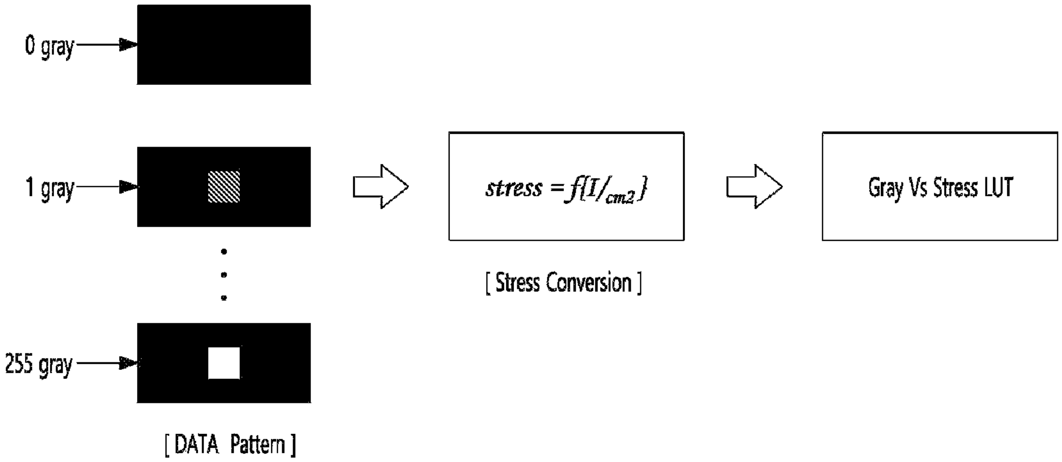
FIG. 6 is a diagram illustrating a stress calculation process based on data counting.
Figure 7:
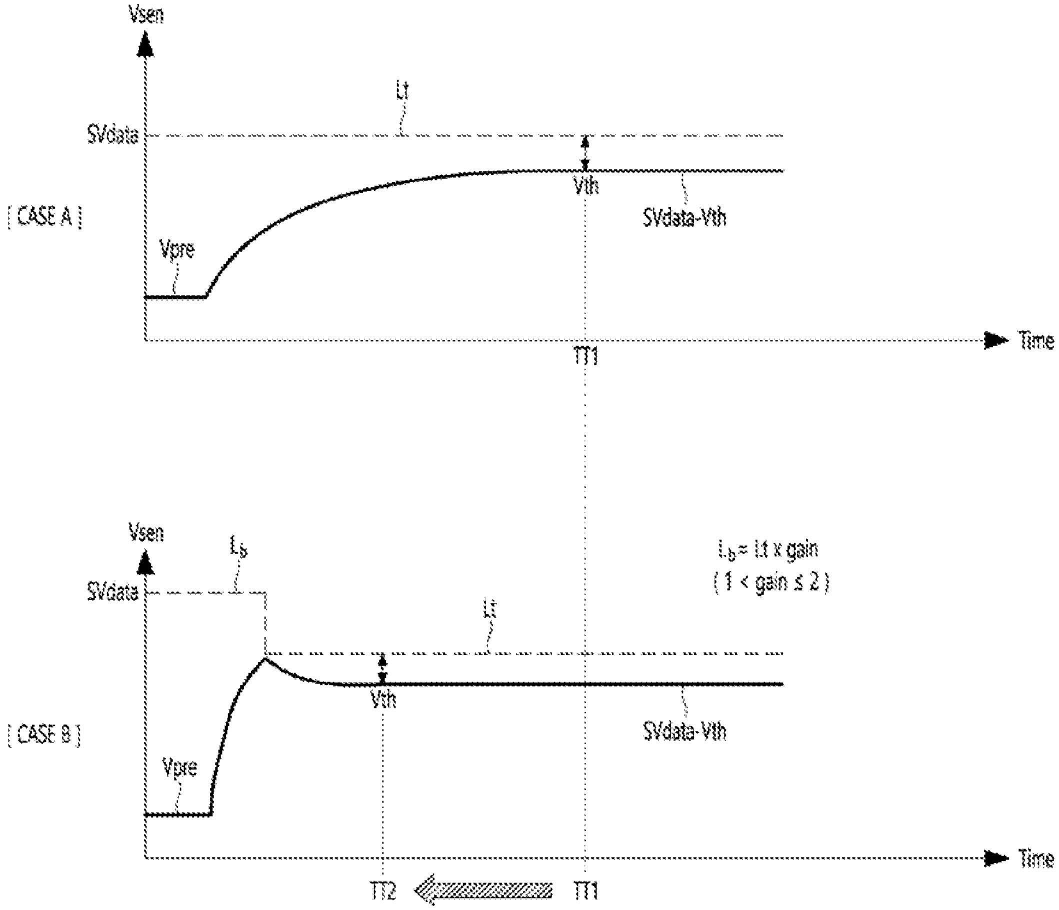
FIG. 7 is a diagram illustrating an example where a sensing time is shortened more in an over driving control (ODC) sensing method than a normal sensing method.

FIG. 4 is a block diagram illustrating a driving device 100 of an electroluminescent display apparatus according to the present aspect. FIG. 5 is a flowchart illustrating a driving method of an electroluminescent display apparatus according to the present aspect. FIG. 6 is a diagram illustrating a stress calculation process based on data counting. FIG. 7 is a diagram illustrating an example where a sensing time is shortened more in an ODC sensing method than a normal sensing method.

Referring to FIG. 4, the driving device 100 of the electroluminescent display apparatus according to the present aspect may include an input unit 101, a pixel line determiner 102, an ODC controller 103, a sensing & driving circuit 104, a compensation value generator 105, and a memory 106. A driving method of the driving device 100 of the electroluminescent display apparatus may be described with reference to FIG. 5.

When a sleep mode entering command is input from a user, the input unit 101 may inform the pixel line determiner 10 of a start of a sleep mode operation (S51).

The pixel line determiner 102 may select a representative pixel line, disposed at a position at which an accumulation stress caused by the repetitive reproduction of an input image is largest, from among all pixel lines (S52). To this end, the pixel line determiner 102 may include a stress accumulation circuit.

The stress accumulation circuit, as in FIG. 6, may calculate a stress value corresponding to each gray level of input image data DATA with reference to a predetermined stress conversion lookup table. A stress value may represent the amount of shift of threshold voltage of a driving element with respect to an accumulation driving time. In the stress conversion lookup table, a stress value corresponding to each gray level of the input image data DATA may be mapped to an accumulation driving time. As a grayscale value increases and an accumulation driving time increases, a stress value may be output through the stress conversion lookup table.

The stress conversion lookup table may be previously generated by a stress value conversion algorithm. In a process of applying a data pattern, a current may be measured by applying a grayscale-based data pattern to a display panel in an initial state before a degradation. In a stress value conversion process, a measured current value may be converted into a stress value by using a predetermined function equation.

The sensing & driving circuit 104 may include a first sensing & driving circuit for pre-sensing pixels of the representative pixel line for each color. The first sensing & driving circuit may be implemented with the data driving circuit 12, the gate driving circuit 13, and the sensing circuit SU described above.

The first sensing & driving circuit may pre-sense pixel characteristic values (i.e., threshold voltages of a driving element) of the representative pixel line for each color (S53). The first sensing & driving circuit may pre-sense the pixel characteristic values of the representative pixel line on the basis of a sensing data voltage SVdata having a single voltage level Lt as in a case A of FIG. 7, or may pre-sense the pixel characteristic values of the representative pixel line on the basis of the sensing data voltage SVdata having multi-voltage levels Lb and Lt as in a case B of FIG. 7. The case A may represent a variation of the sensing voltage Vsen based on the normal sensing method, and the case B may represent a variation of the sensing voltage Vsen based on the ODC sensing method.

The Ids proportional to a difference voltage Vgs between the sensing data voltage SVdata and the reference voltage Vpre may flow in a driving element of each pixel included in the representative pixel line in a pre-sensing period, and a source node voltage (i.e., the sensing voltage Vsen) of the driving element may progressively increase based on the Ids. An increase operation of the sensing voltage Vsen may be continued until the driving element is turned off, based on a voltage following scheme. Also, the sensing voltage Vsen may be saturated to "SVdata−Vth" from a timing at which the driving element is turned off.

To shorten the pre-sensing period, a saturation timing of the sensing voltage Vsen should be advanced. Because the saturation timing of the sensing voltage Vsen is based on a rising slope of the sensing voltage Vsen, the ODC sensing method where a rising slope is relatively steep may be shortened more in a sensing period than the normal sensing method. For example, a saturation timing may be "TT1" in the case A of FIG. 7 and may be "TT2" in the case B. In this case, "TT2" may be earlier than "TT1".

The first sensing & driving circuit may supply the ODC controller 103 with pixel characteristic values PSO of the representative pixel line pre-sensed for each color.

The ODC controller 103 may select a color-based sample pixel characteristic value from among the pixel characteristic values of the representative pixel line obtained through pre-sensing and may control a sensing priority of a color, based on a relative magnitude of a variation amount of the color-based sample pixel characteristic value (S54). For example, the ODC controller 103 may selects, as the color-based sample pixel characteristic value, a color-based maximum value from among the pixel characteristic values of each color of the representative pixel line. For example, when the relative magnitude of a variation amount of the color-based sample pixel characteristic value is "W>G>R>B", the ODC controller 103 may determine sensing priorities of colors to be "W→G→R→B", and the ODC controller 103 may output a sensing priority control signal PCS for allowing ODC sensing to be performed in the order thereof.

The sensing & driving circuit 104 may include a second sensing & driving circuit for ODC-sensing all pixel lines according to a sensing priority. The second sensing & driving circuit may be implemented with the data driving circuit 12, the gate driving circuit 13, and the sensing circuit SU described above. The first sensing & driving circuit may be the same as the second sensing & driving circuit. That is, the sensing & driving circuit 104 may continuously perform an operation of the first sensing & driving circuit and an operation of the second sensing & driving circuit.

The second sensing & driving circuit may update a compensation value while sequentially ODC-sensing pixel characteristic values of all pixel lines for each color, based on the sensing priority control signal PCS.

The second sensing & driving circuit may ODC-sense first-sensing-priority color pixels of all pixel lines to supply a first-priority ODC sensing value OSO to the compensation value generator 105, may ODC-sense second-sensing-priority color pixels of all pixel lines to supply a second-priority ODC sensing value OSO to the compensation value generator 105, may ODC-sense third-sensing-priority color pixels of all pixel lines to supply a third-priority ODC sensing value OSO to the compensation value generator 105, and may ODC-sense fourth-sensing-priority color pixels of all pixel lines to supply a fourth-priority ODC sensing value OSO to the compensation value generator 105 (S55 to S58).

The second sensing & driving circuit may perform ODC sensing on the pixel characteristic values of all pixel lines on the basis of the sensing data voltage SVdata having the multi-voltage levels Lb and Lt as in the case B of FIG. 7, thereby reducing a sensing period. The sensing data voltage SVdata having the multi-voltage levels Lb and Lt may have a boosting voltage level Lb and a target voltage level Lt succeeding the boosting voltage level Lb. The target voltage level Lt is supplied to each of the color pixels later than the boosting voltage level Lb. The boosting voltage level Lb may for increasing a rising slope of the sensing voltage Vsen to reduce an ODC sensing period and may be set to be higher than the target voltage level Lt. The target voltage level Lt may be for determining a saturation level "SVdata−Vth" of the sensing voltage Vsen and may be a voltage which is designed based on an input range of the analog-to-digital converter ADC. The boosting voltage level Lb may be set to "target voltage level (Lt)*gain", and the gain may be greater than 1 and less than or equal to 2.

Based on the ODC sensing method performed by the second sensing & driving circuit, one sensing period for all pixels may be considerably reduced compared to the case A (the normal sensing period) of FIG. 7.

The compensation value generator 105 may sequentially receive first to fourth-priority ODC sensing values OSO from the second sensing & driving circuit. The compensation value generator 105 may compare the first to fourth-priority ODC sensing values OSO with pre-stored color-based initial characteristic values to calculate the amount of shift of threshold voltage of a driving element with respect to all pixels. Also, by using a predetermined compensation algorithm, the compensation value generator 105 may individually generate a compensation value COMP, which is for compensating for Ids variation caused by the amount of shift of threshold voltage of the driving element, for color pixels. The compensation value COMP may include a plurality of first compensation values COMP1 for compensating for the first-sensing-priority color pixels, a plurality of second compensation values COMP2 for compensating for the second-sensing-priority color pixels, a plurality of third compensation values COMP3 for compensating for the third-sensing-priority color pixels, and a plurality of fourth compensation values COMP4 for compensating for the fourth-sensing-priority color pixels.

The compensation value generator 105 may update the memory 106 with the color-based compensation values COMP. The compensation value generator 105 may further store a bit value of a flag signal in the memory 106. The bit value of the flag signal may represent whether to update a compensation value of each color. A color where a bit value is '1' may represent a color on which updating of a compensation value is completed in the same update period. On the other hand, a color where a bit value is '0' may represent a color on which updating of a compensation value is not completed in the same update period. Whenever a compensation value update period is completed, bit values of flag signals for all colors may be simultaneously reset to '0'.

The ODC controller 103 may perform control so that ODC sensing is performed based on a sensing priority in each sleep mode period with reference to the bit values of the flag signals stored in the memory 106, and in this case, ODC sensing starts from a color (or colors) where a bit value is '0'.

Figure 8:
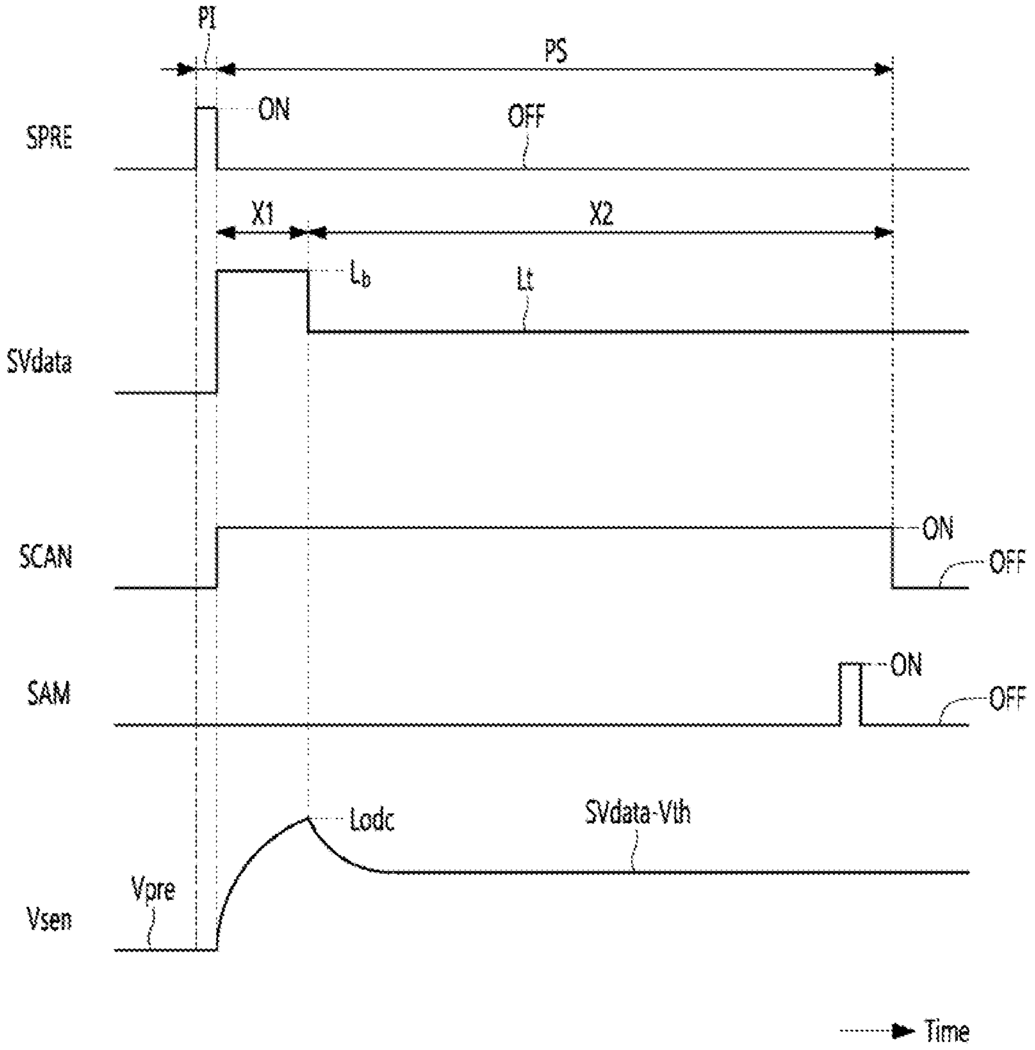
FIG. 8 is a driving waveform diagram for implementing an ODC sensing method according to an aspect.

FIG. 8 is a driving waveform diagram for implementing an ODC sensing method according to an aspect.

The sensing & driving circuit 104 (see FIG. 4) according to the present aspect may perform an ODC sensing operation, based on a driving waveform of FIG. 8.

Referring to FIG. 8, the ODC sensing operation may include an initialization period PI and a sensing period PS.

In the initialization period PI, a reference voltage Vpre may be supplied to the line capacitor LCa of the sensing line 14B in response to an initialization control signal SPRE having an on level.

In the sensing period PS, a sensing scan signal SCAN may maintain an on level. The sensing period PS may include a first period X1 where a sensing data voltage SVdata having a boosting voltage level Lb is supplied and a second period X2 where a sensing data voltage SVdata having a target voltage level Lt is supplied. Based on a reduction in a sensing period, it may be required to decrease the first period X1 as much as possible, compared to the second period X2.

Vgs of a driving element may be higher in the first period X1 than the second period X2. Ids of the driving element may be higher in the first period X1 than the second period X2. A source node voltage (i.e., a sensing voltage Vsen) of the driving element may increase quickly up to an ODC voltage level Lodc which is higher than a saturation level "SVdata−Vth", in the first period X1. The sensing voltage Vsen may be stabilized from the ODC voltage level Lodc to the saturation level "SVdata−Vth" in the second period X2.

In the sensing period PS, the sensing voltage Vsen having the saturation level "SVdata−Vth" may be sampled by a sampling control signal SAM having an on level.

Furthermore, a ratio occupied by the first period X1 and the second period X2 in the sensing period, the boosting voltage level Lb, and the target voltage level Lt may be differently set according to the sensing priority of each color. In other words, a ratio occupied by the first period X1 and the second period X2 in the sensing period, the boosting voltage level Lb, and the target voltage level Lt may be differently set in R, W, G, and B pixels. Accordingly, a threshold voltage of a driving element included in each of the R, W, G, and B pixels may be accurately sensed.

Figure 9:
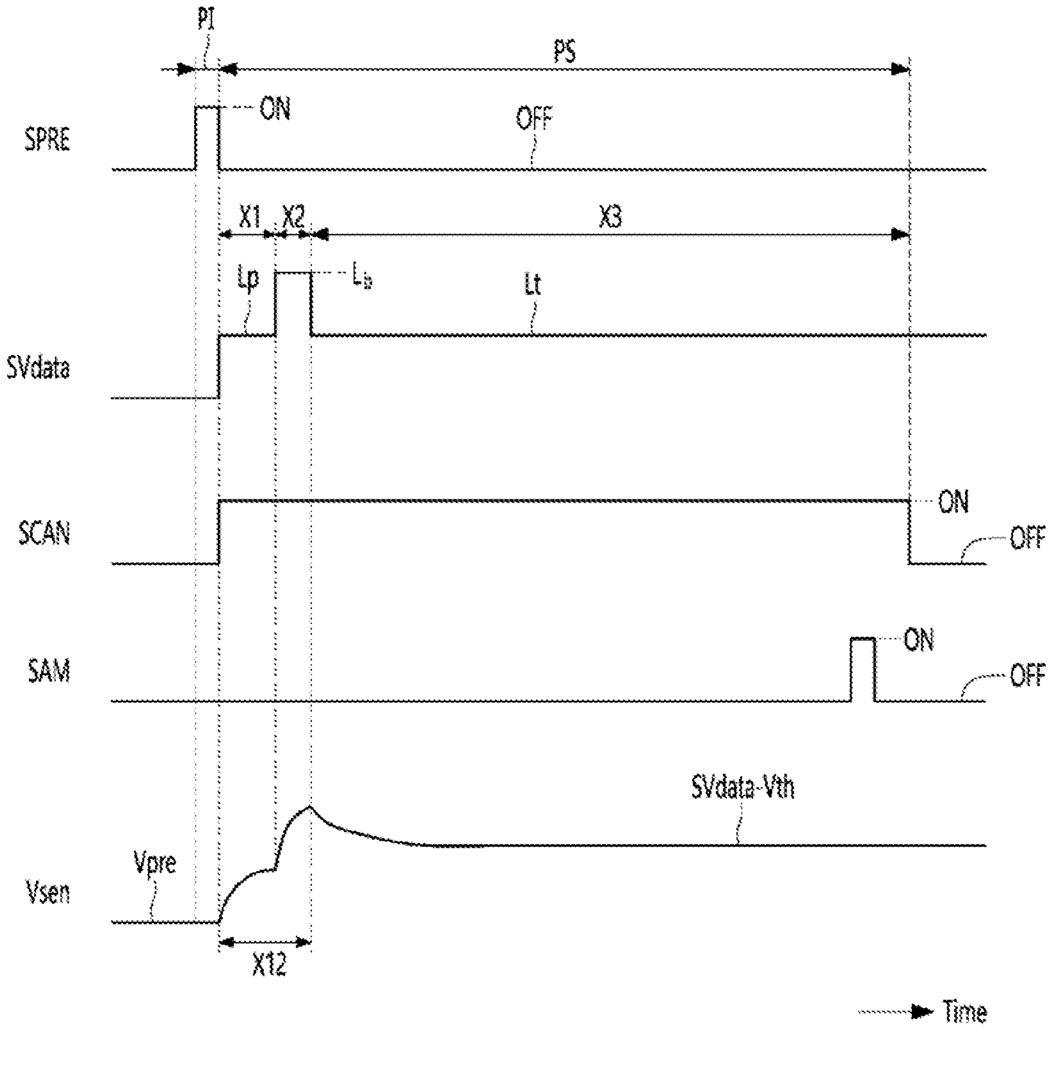
FIG. 9 is a driving waveform diagram for implementing an ODC sensing method according to another aspect.

FIG. 9 is a driving waveform diagram for implementing an ODC sensing method according to another aspect.

The sensing & driving circuit 104 (see FIG. 4) according to the present aspect may perform an ODC sensing operation, based on a driving waveform of FIG. 9.

Referring to FIG. 9, the ODC sensing operation may include an initialization period PI and a sensing period PS.

In the initialization period PI, a reference voltage Vpre may be supplied to the line capacitor LCa of the sensing line 14B in response to an initialization control signal SPRE having an on level.

In the sensing period PS, a sensing scan signal SCAN may maintain an on level. In the sensing period PS, a sensing data voltage SVdata may have a precharge voltage level Lp, a boosting voltage level Lb succeeding the precharge voltage level Lp, and a target voltage level Lt succeeding the boosting voltage level Lb. The boosting voltage level Lb is supplied to each of the color pixels later than the precharge voltage level Lp. The target voltage level Lt is supplied to each of the color pixels later than the boosting voltage level Lb. To advance a saturation timing of the sensing voltage Vsen, the boosting voltage level Lb may be set to be higher than the target voltage level Lt. In the sensing period PS, to decrease sensing distortion caused by coupling between a data line and a sensing line, the sensing data voltage SVdata may be applied to the precharge voltage level Lp before being applied at the boosting voltage level Lb. The precharge voltage level Lp may be lower than the boosting voltage level Lb. The precharge voltage level Lp may be equal to the target voltage level Lt, lower than the target voltage level Lt, or higher than the target voltage level Lt.

The sensing period PS may include a first period X1 where a sensing data voltage SVdata having the precharge voltage level Lp is supplied, a second period X2 where a sensing data voltage SVdata having the boosting voltage level Lb is supplied, and a third period X3 where a sensing data voltage SVdata having the target voltage level Lt is supplied. Based on a reduction in a sensing period, it may be required to decrease a sum period X12 of the first period X1 and the second period X2 as much as possible, compared to the third period X3. For example, the sum period X12 may be set to about 20% of the third period X3.

When an adverse coupling effect caused by the boosting voltage level Lb is small applied between a data line and a sensing line, a ratio occupied by the first period X1 in the sum period X12 may be equal to a ratio occupied by the second period X2 in the sum period X12. In this case, the first period X1 and the second period X2 may have a ratio of 1:1.

When an adverse coupling effect caused by the boosting voltage level Lb is largely applied between the data line and the sensing line, a ratio occupied by the first period X1 in the sum period X12 may be greater than a ratio occupied by the second period X2 in the sum period X12. In this case, the first period X1 and the second period X2 may have a ratio of 2:1 or a ratio of 3:1.

Furthermore, a ratio occupied by the sum period X12 and the third period X3 in the sensing period, the precharge voltage level Lp, the boosting voltage level Lb, and the target voltage level Lt may be differently set according to the sensing priority of each color. In other words, a ratio occupied by the sum period X12 and the third period X3 in the sensing period, the precharge voltage level Lp, the boosting voltage level Lb, and the target voltage level Lt may be differently set in R, W, G, and B pixels. Accordingly, a threshold voltage of a driving element included in each of the R, W, G, and B pixels may be accurately sensed.

Figure 10:
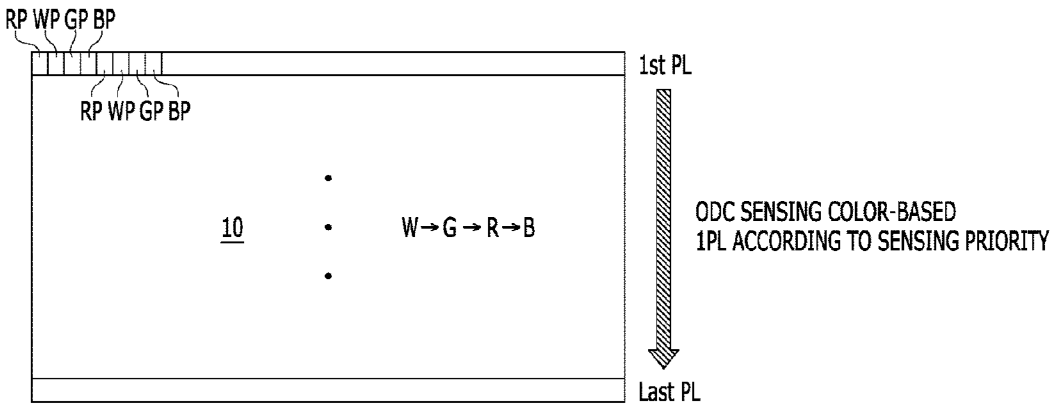
FIG. 10 is a diagram illustrating pixel lines of a display panel on which color-based OCD sensing is performed by one pixel line units, based on a sensing priority.
Figure 11:
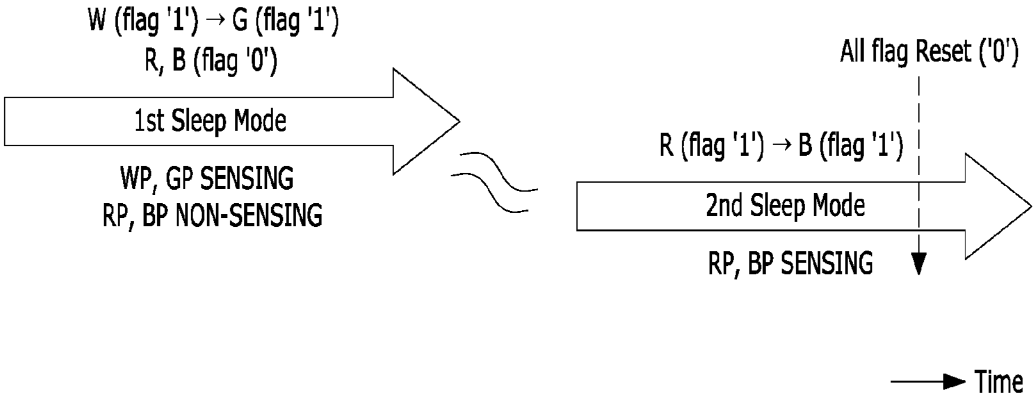
FIG. 11 is a diagram illustrating an example where an ODC sensing operation and a compensation value update operation are continuously performed on pixels of four colors in a plurality of sleep mode periods, based on a flag signal.

FIG. 10 is a diagram illustrating pixel lines of a display panel on which color-based OCD sensing is performed by one pixel line units, based on a sensing priority. FIG. 11 is a diagram illustrating an example where an ODC sensing operation and a compensation value update operation are continuously performed on pixels of four colors in a plurality of sleep mode periods, based on a flag signal.

Referring to FIGS. 10 and 11, each of an R pixel RP, a W pixel WP, a G pixel GP, and a B pixel BP may be provided in plurality in each pixel line PL of a display panel 10.

The sensing & driving circuit 104 (see FIG. 4) may perform color-based ODC sensing by pixel line units according to a sensing priority (for example, the order of W→G→R→B) of each color based on a relative magnitude of a variation amount of a color-based sample pixel characteristic value. Such an operation may be performed up to a last pixel line from a first pixel line of the display panel 10.

The compensation value generator 105 (see FIG. 4) according to the present aspect may generate color-based compensation values COMP corresponding to pixel characteristic values obtained through color-based ODC sensing and may update a memory with the color-based compensation values COMP along with color-based flag signals. For example, the compensation value generator 105 may store, as '1', flag signals for W and G pixels WP and GP on which an ODC sensing operation and a compensation value update operation are completed in a first sleep mode period and may store, as '0', flag signals for R and B pixels RP and BP on which an ODC sensing operation and a compensation value update operation are not performed (or not completed).

The ODC sensing operation and the compensation value update operation on the R and B pixels RP and BP may be completed in a second sleep mode period. When the ODC sensing operation and the compensation value update operation on the R and B pixels RP and BP are completed in the second sleep mode period, the flag signals for the R and B pixels RP and BP may be changed to '1', and one update period of the R, W, G, and B pixels RP, WP, GP, and BP may be completed. When the one update period is completed, all of the flag signals for the R, W, G, and B pixels RP, WP, GP, and BP may be reset to '0'.

The present aspect may realize the following effects.

The driving device of the electroluminescent display apparatus according to the present aspect may perform an ODC sensing operation, based on a sensing data voltage having multi-voltage levels during a sleep mode period, and thus, may considerably shorten one sensing period corresponding to all pixels compared to the related art.

The driving device of the electroluminescent display apparatus according to the present embodiment may determine a color-based sensing priority in descending order of a variation amount of pixel characteristic value, based on data counting, and may perform a color-based ODC sensing operation and a compensation value update operation according to the sensing priority in a sleep mode period. When a current sleep mode period ends in performing the ODC sensing operation, the driving device of the electroluminescent display apparatus may delete sensing values of color pixels on which sensing is not completed and may perform the ODC sensing operation and the compensation value update operation from the color pixels on which sensing is not completed, in entering a next sleep mode, and thus, may secure sensing and compensation performance.

The effects according to the present disclosure are not limited to the above examples, and other various effects may be included in the specification.

It I will be apparent to those skilled in the art that various modifications and variations can be made in the driving device and the driving method of electroluminescent display apparatus of the present disclosure without departing from the spirit or scope of the aspects. Thus, it is intended that the present disclosure covers the modifications and variations of the aspects provided they come within the scope of the appended claims and their equivalents.

What is claimed is:

1. A driving device of an electroluminescent display apparatus including a display panel having a plurality of pixel lines and a plurality of pixels disposed on each pixel line, the driving device comprising:

a pixel line determiner selecting a representative pixel line, disposed at a position at which an accumulation stress caused by an input image is largest, from among all pixel lines;

a first sensing & driving circuit pre-sensing pixels disposed on the representative pixel line for each color;

an over driving control (ODC) controller selecting a color-based sample pixel characteristic value from among pixel characteristic values of the representative pixel line obtained through the pre-sensing and controlling a sensing priority of each color, based on a relative magnitude of a variation amount of the color-based sample pixel characteristic value;

a second sensing & driving circuit performing ODC sensing on color pixels of all pixel lines, based on the sensing priority of each color; and a compensation value generator updating compensation values of the color pixels, based on pixel characteristic values of the color pixels obtained through the ODC sensing, wherein a sensing data voltage supplied to each of the color pixels has multi-voltage levels, in a sensing period for the ODC sensing.

2. The driving device of claim 1, wherein the ODC controller selects, as the color-based sample pixel characteristic value, a color-based maximum value of each color from among the pixel characteristic values of the representative pixel line.

3. The driving device of claim 1, wherein the sensing data voltage has a boosting voltage level and a target voltage level supplied to each of the color pixels later than the boosting voltage level, and the boosting voltage level is higher than the target voltage level.

4. The driving device of claim 3, wherein the sensing period comprises a first period where the boosting voltage level is supplied to each of the color pixels and a second period where the target voltage level is supplied to each of the color pixels, and the first period is shorter than the second period.

5. The driving device of claim 4, wherein a ratio occupied by the first period and the second period in the sensing period, the boosting voltage level, and the target voltage level are differently set according to the sensing priority of each color.

6. The driving device of claim 1, wherein the sensing data voltage has a precharge voltage level, a boosting voltage level supplied to each of the color pixels later than the precharge voltage level, and a target voltage level supplied to each of the color pixels later than the boosting voltage level, and the boosting voltage level is higher than the target voltage level, and the precharge voltage level is lower than the boosting voltage level.

7. The driving device of claim 6, wherein the sensing period comprises a first period where the precharge voltage level is supplied to each of the color pixels, a second period where the boosting voltage level is supplied to each of the color pixels, and a third period where the target voltage level is supplied to each of the color pixels, and a sum period of the first period and the second period is shorter than the third period.

8. The driving device of claim 7, wherein, in the sum period, a ratio occupied by the first period is higher than or equal to a ratio occupied by the second period.

9. The driving device of claim 7, wherein a ratio occupied by each of the sum period and the third period in the sensing period, the precharging voltage level, the boosting voltage level, and the target voltage level are differently set according to the sensing priority of each color.

10. The driving device of claim 1, wherein the first sensing & driving circuit and the second sensing & driving circuit are integrated into a single circuit.

11. A driving method of an electroluminescent display apparatus including a display panel having a plurality of pixel lines and a plurality of pixels disposed on each pixel line, the driving method comprising:

selecting a representative pixel line, disposed at a position at which an accumulation stress caused by an input image is largest, from among all pixel lines;

pre-sensing pixels disposed on the representative pixel line for each color;

selecting a color-based sample pixel characteristic value from among pixel characteristic values of the representative pixel line obtained through the pre-sensing and controlling a sensing priority of each color, based on a relative magnitude of a variation amount of the color-based sample pixel characteristic value;

performing over driving control (ODC) sensing on color pixels of all pixel lines, based on the sensing priority of each color; and updating compensation values of the color pixels, based on pixel characteristic values of the color pixels obtained through the ODC sensing, wherein a sensing data voltage supplied to each of the color pixels has multi-voltage levels, in a sensing period for the ODC sensing.

12. The driving method of claim 11, wherein a color-based maximum value is selected as the color-based sample pixel characteristic value from among the pixel characteristic values of each color of the representative pixel line.

13. The driving method of claim 11, wherein the sensing data voltage has a boosting voltage level and a target voltage level supplied to each of the color pixels later than the boosting voltage level, and the boosting voltage level is higher than the target voltage level.

14. The driving method of claim 13, wherein the sensing period comprises a first period where the boosting voltage level is supplied to each of the color pixels and a second period where the target voltage level is supplied to each of the color pixels, and the first period is shorter than the second period.

15. The driving method of claim 14, wherein a ratio occupied by the first period and the second period in the sensing period, the boosting voltage level, and the target voltage level are differently set according to the sensing priority of each color.

16. The driving method of claim 15, wherein the sensing data voltage has a precharge voltage level, a boosting voltage level supplied to each of the color pixels later than the precharge voltage level, and a target voltage level supplied to each of the color pixels later than the boosting voltage level, and the boosting voltage level is higher than the target voltage level, and the precharge voltage level is lower than the boosting voltage level.

17. The driving method of claim 16, wherein the sensing period comprises a first period where the precharge voltage level is supplied to each of the color pixels, a second period where the boosting voltage level is supplied to each of the color pixels, and a third period where the target voltage level is supplied to each of the color pixels, and a sum period of the first period and the second period is shorter than the third period.

18. The driving method of claim 17, wherein, in the sum period, a ratio occupied by the first period is higher than or equal to a ratio occupied by the second period.

19. The driving method of claim 11, wherein the ODC sensing and the updating of the compensation values are performed in a sleep mode period where the input image is not displayed on the display panel.

20. The driving method of claim 19, wherein the sleep mode period comprises a first sleep mode period and a second sleep mode period arranged adjacent to each other with a display mode period, where the input image is displayed, therebetween, and in the first sleep mode period and the second sleep mode period, the ODC sensing and the updating of the compensation values are continuously performed based on the sensing priority of each color.

* * * * *